United States Patent
Avery et al.

(10) Patent No.: US 9,692,763 B2
(45) Date of Patent: *Jun. 27, 2017

(54) DOCUMENT EVENT NOTIFICATIONS BASED ON DOCUMENT ACCESS CONTROL LISTS

(71) Applicant: International Business Machines Corporation, Armonk, NY (US)

(72) Inventors: Kenytt D. Avery, Newport Beach, CA (US); Vincent Q. Le, Mission Viejo, CA (US); Kevin N. Trinh, Garden Grove, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,564

(22) Filed: Feb. 12, 2014

(65) Prior Publication Data

US 2015/0229647 A1 Aug. 13, 2015

(51) Int. Cl.

| G06F 21/62 | (2013.01) |
| H04L 29/06 | (2006.01) |
| G06F 17/30 | (2006.01) |
| H04L 29/08 | (2006.01) |

(52) U.S. Cl.
CPC ...... *H04L 63/101* (2013.01); *G06F 17/30011* (2013.01); *G06F 21/62* (2013.01); *H04L 67/10* (2013.01); *H04L 67/1097* (2013.01); *H04L 67/42* (2013.01)

(58) Field of Classification Search
CPC ... G06F 17/30011; G06F 21/62; H04L 63/101
See application file for complete search history.

(56) References Cited

U.S. PATENT DOCUMENTS

| 7,836,080 | B2 | 11/2010 | DeBie |
| 7,844,998 | B2 | 11/2010 | Kelley et al. |
| 7,958,562 | B2 | 6/2011 | Gaucas |
| 8,176,146 | B2 | 5/2012 | Sembugamoorthy et al. |
| 8,464,206 | B2 | 6/2013 | Jenkins et al. |
| 8,527,468 | B1 * | 9/2013 | Crafford et al. ............. 707/662 |
| 2006/0026502 | A1 * | 2/2006 | Dutta .................... G06Q 10/10 715/230 |
| 2007/0047006 | A1 * | 3/2007 | Sakai .......................... 358/400 |

(Continued)

OTHER PUBLICATIONS

McCollum et al., "Beyond the Pale of MAC and DAC—Defining New Forms of Access Control", 1990, pp. 190-200.*

(Continued)

*Primary Examiner* — David Pearson
*Assistant Examiner* — Thaddeus Plecha
(74) *Attorney, Agent, or Firm* — Farrokh Pourmirzaie; Edell, Shapiro & Finnan, LLC

(57) ABSTRACT

A content management system manages documents such that a document is received and stored in the content management system. Access privileges (e.g., an Access Control List) to the document are defined for one or more users of the content management system. An occurrence of a document life cycle event with respect to the document is detected and a distribution list is generated for notifying the one or more users of the document life cycle event based on the access privileges of the one or more users.

9 Claims, 4 Drawing Sheets

(56) References Cited

U.S. PATENT DOCUMENTS

| | | |
|---|---|---|
| 2007/0220016 A1* | 9/2007 | Estrada et al. ............... 707/100 |
| 2009/0064101 A1* | 3/2009 | Boss et al. .................... 717/113 |
| 2009/0141881 A1* | 6/2009 | Lederer et al. .......... 379/201.12 |
| 2011/0161425 A1* | 6/2011 | Xiao et al. ................... 709/206 |
| 2011/0205576 A1* | 8/2011 | Halron .............. G06F 17/30011 358/1.15 |
| 2011/0238617 A1* | 9/2011 | Ozawa .............. G06F 17/30011 707/608 |
| 2012/0204260 A1 | 8/2012 | Cecil et al. |
| 2012/0310983 A1 | 12/2012 | Mittal et al. |
| 2012/0317414 A1 | 12/2012 | Glover |

OTHER PUBLICATIONS

Google Documents List API version 3.0, https://developers.google.com/google-apps/documents-list/#email_notifications_of_acl_changes, May 10, 2013.

IBM, "Method and System for Automating Workflow Participation", IP.com, IPCOM000184058D, Jun. 9, 2009, 5 pages.

"A decentralized invitation mechanism for protected document distribution whilst retaining persistent encryption/document control", IP.com, IPCOM000218789D, Jun. 7, 2012, 6 pages.

Zhu et al., "IBM FileNet P8 Platform and Architecture", International Business Machines Corporation, Redbooks, Verision 5, Apr. 2011.

* cited by examiner

Select Users and Groups

Select Object Type:
☐ Groups    ☑ Users    ☑ Include Special Accounts

Select Realm:    dc=hqpsidcdom, dc=com

Search Criteria:
◉ Short Name     Starts with ▼
○ Display Name

Sort Order:    None ▼

Maximum results returned:    500

[Find]

| Display Name | Short Name | Principal Name |
|---|---|---|
| Afton H. Banner | abanner | abanner@hqpsidcdom.com |
| Antoine S. Bannister | abannister | abannister@hqpsidcdom.com |
| Ardith H. Bannon | abannon | abannon@hqpsidcdom.com |
| Amada D. Banome | abanome | abanome@hqpsidcdom.com |
| Alvaro S. Bantz | abantz | abantz@hqpsidcdom.com |
| Annabell P. Baquet | abaquet | abaquet@hqpsidcdom.com |
| Arron J. Barabas | abarabas | abarabas@hqpsidcdom.com |

400

[OK]  [Cancel]  [Help]

FIG.4

DOCUMENT EVENT NOTIFICATIONS BASED ON DOCUMENT ACCESS CONTROL LISTS

BACKGROUND

1. Technical Field

Present invention embodiments relate to document life cycle event notifications, and more specifically, to utilizing a document access control list to notify document stakeholders of document policy events.

2. Discussion of the Related Art

Managing organizational information, such as documents or personnel records, as an organization grows becomes increasingly complex. To facilitate information management, many organizations employ an Enterprise Content Management (ECM) system. The ECM systems can provide techniques to manage a document over a document's life cycle. For example, a team of individuals starts the document's life cycle by initially creating a new document. At some point, the document is modified or updated as the document's requirements change (e.g., an engineering design change for an engineering document) and a new version of the document is released for use by the organization. Those individuals that have an interest in the document, such as document creators and users, are sometimes referred to as document stakeholders. Eventually, the document may become obsolete (e.g., a product used on the document is discontinued) and the document is marked for removal from the ECM system, thereby ending the life cycle of the document.

One function of an Enterprise Content Management (ECM) system may be to allow groups of users to collaborate on a document over the document's life cycle. During collaboration, the ECM systems may allow a document's stakeholders to be notified when changes are made to the document. Notifications may be triggered by various mechanisms such as events or workflow changes, and the notifications are sent to the users and user groups. Each event or workflow may specify one or more distribution lists that include users to be notified when a given condition is met (e.g., a document update or status change).

In a large ECM system with many documents, users, groups, events, retention periods, life cycle policies, and workflows, it becomes difficult to keep track of the intended users and groups mapped to any given distribution list. Further, distribution list mappings need to be updated or maintained as stakeholders change. One approach is to maintain the distribution list manually, where a document administrator or owner specifies a distribution list. In these large ECM systems, repository notification mechanisms become cumbersome to manage and are prone to errors. When the repository becomes large enough, it may not be feasible to map notification mechanisms to distribution lists manually (e.g., given the number of documents, users, and the resulting number of system notifications). Another approach may include a self-service model where users subscribe to notifications for various documents of interest. In self-service scenario, each user maintains a list of those documents of interest. In either the manual model or the self-service model, users may have an interest in documents for which they are unaware.

BRIEF SUMMARY

According to one embodiment of the present invention, a computer-implemented method of managing documents in a content management system is described. The content management system generates a distribution list from access privileges for a document in response to occurrence of a life cycle event associated with the document. Members of the distribution list are notified (e.g., of the document life cycle event). Embodiments of the present invention further include a system and computer program product for notifying users of a document life cycle event in substantially the same manner described above.

BRIEF DESCRIPTION OF THE SEVERAL VIEWS OF THE DRAWINGS

Generally, like reference numerals in the various figures are utilized to designate like components.

FIG. 4 is a graphical illustration of an example GUI screen depicting email address resolution for a user in order to provide notifications to the user regarding the given document according to an embodiment of the present invention.

DETAILED DESCRIPTION

Present invention embodiments simplify distribution list management for document life cycle event notifications (e.g., document modifications or potential document deletion events) by generating user notification distribution lists based on a user's document access privileges contained in document Access Control Lists (ACLs). Typically, an ACL may allow or deny access to a document or other software object (e.g., an executable program, folder or the ACL itself). When an ACL allows a user to access a document, the access privilege may be further defined as the user's privilege to read the document (e.g., a read-only privilege) or to change the document (e.g., a read-write privilege). In essence, an ACL is list of permissions attached or bound to an object such as document, picture or other stored file. The ACL may also be referred to as a security ACL.

In such environments that use computer document access privileges, such privileges may include full control (e.g., as accorded to a document's owner or a system administrator), permission to list subdirectory contents, permission to delete documents, or any other defined privileges. Object or document access privileges may further include certain levels of granularity. For example, a given user may be allowed read access to "section A" of a document, write/modify access to "section B" of a document, and denied access to any other portion of the document; all of which privileges are defined in the document's ACL. In this regard, a particular workflow may be assigned to a user group with write/modify access to "section B" of a document such that the document is modified in an orderly fashion. When one user is finished with their workflow task, an event notification may be generated to inform the next user that the document is ready for their part of the workflow assignment.

Notification distribution list management efficiencies may be optimized using the techniques described herein by leveraging the privileges for a user or other entity (e.g., a software application, system, etc.) that are inherently captured by an ACL for the document, i.e., an ACL is also usually a function of the document stakeholders. For example, when a document is changed, those stakeholders with document "write" privileges may be notified in order to solicit their approval of the document changes prior to the release of a new version of the document. In a follow on example, once a new version of the document is released, those stakeholders with document "read" privileges may be notified in order to inform those users that they can read changes to the latest version of the document. By the above example, the ACL based distribution list may be filtered using the user's "write" privilege or "read" privilege as provided by the ACL. As such, a user may be included on one or both of the "write" and "read" notification distribution lists, while those ECM users not on either distribution list may be ignored.

Figure 1:
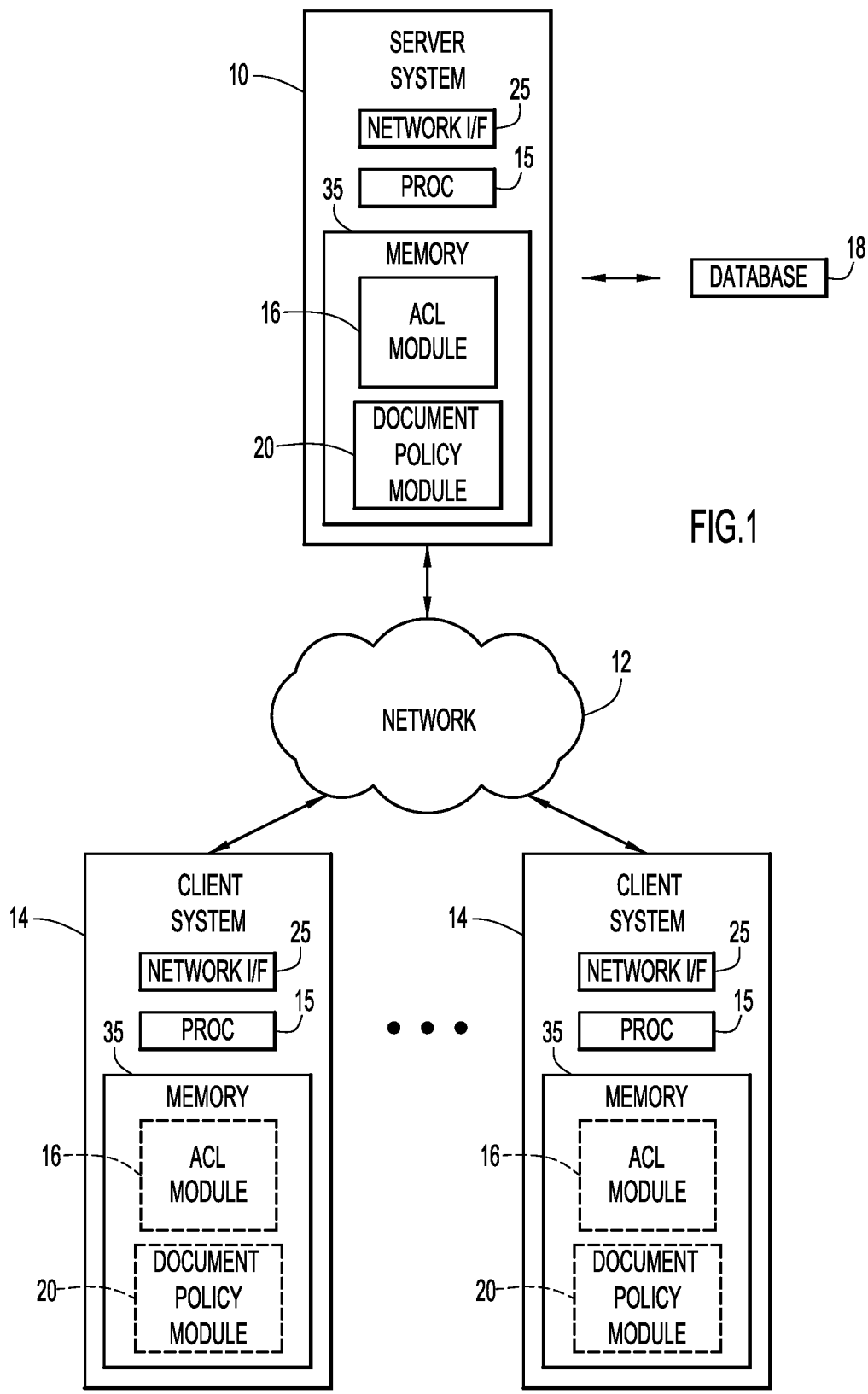
FIG. 1 is a diagrammatic illustration of an example computing environment for use with an embodiment of the present invention.

An example environment for use with present invention embodiments is illustrated in FIG. 1. Specifically, the environment includes one or more servers or server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, intranet, etc.). Alternatively, server systems 10 and client systems 14 may be local to each other, and communicate via any appropriate local communication medium (e.g., local area network (LAN), data center network, hardwire, wireless link, intranet, etc.).

Server systems 10 and client systems 14 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, ACL module, document policy module, browser/interface software, etc.). Server systems 10 may comprise compute and storage nodes (e.g., in a datacenter or server farm).

Client systems 14 may be used to facilitate management of documents during their life cycles as part of an ECM system (implemented by server systems 10), or to set up ACLs by an administrator as part of the ECM system or by way of a separate administrative system. The server systems 10 may include an ACL module 16 to manage ACLs (e.g., document access privileges by users and user groups), and a document policy module 20 to detect document life cycle events and generate user notifications regarding such document life cycle events. A database system 18 may store various information for managing documents in the ECM system (e.g., document databases, ACLs, policies, etc.).

For example, a user (or user group) with permission may Check a document out from the ECM system in order to modify the document. The checked out document may be stored on server systems 10 and modified by way of client system 14. Once the document is modified, the document may be checked-in to the ECM system and stored on database system 18. The document check-in is an event that may be deemed significant enough to generate an event notification distribution list (e.g., by document policy module 20). When a document related event occurs (e.g., a document change, a retention policy based document deletion, etc.), notification messages (e.g., emails, text messages, etc.) are generated and sent to users in a distribution list (e.g., generated by document policy module 20) based on the document's ACL (e.g., as defined and bound to the document by ACL module 16)

The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, intranet, etc.). Any clients or servers may present a graphical user interface (e.g., GUI, etc.) or other interface (e.g., command line prompts, menu screens, etc.) to solicit information from users pertaining to managing documents, and may provide document event notification information (e.g., emails, ECM messages, etc.), such as in reports to the user, which client or server may present via the display or a printer or may send to another device/system for presenting to the user.

Alternatively, one or more client systems 14 may perform document event notifications when operating as a stand-alone unit (i.e., without using server systems 10). In a stand-alone mode of operation, the client system stores or has access to the data (e.g., documents, ACLs, etc.), and includes ACL module 16 to manage ACLs and bind them to documents and document policy module 20 to perform distribution list generation based on ACLs. The graphical user interface (e.g., GUI, etc.) or other interface (e.g., command line prompts, menu screens, etc.) solicits information from a corresponding user pertaining to document management, and may provide documents life cycle event notifications and may including a notification history. It should be understood that a server system may operate in a stand-alone mode and include an ACL module 16 and/or a document policy module 20.

ACL module 16 and document policy module 20 may include one or more modules or units to perform the various functions of present invention embodiments described below. The various modules (e.g., ACL module, document policy module, etc.) may be implemented by any combination of any quantity of software and/or hardware modules or units, and may reside within memory 35 of the server and/or client systems for execution by processor 15. It should be understood, that the computing environment depicted in FIG. 1 provides example platforms (e.g., server systems 10, client systems 14) for illustrating the techniques described herein. In this regard, ACLs, documents and policies on one client system 14 may have no relationship with ACLs, documents and policies on another client system 14.

Figure 2:
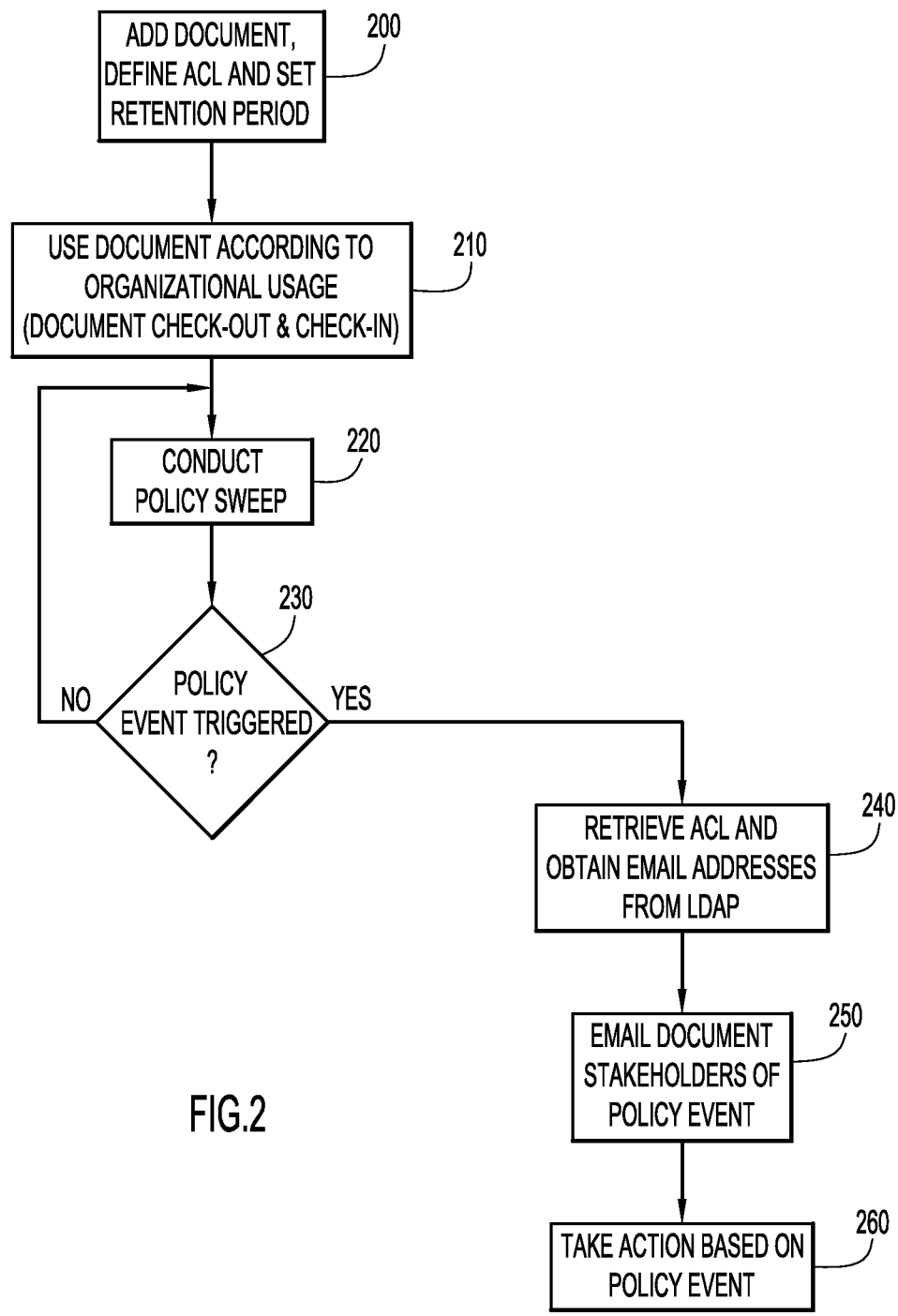
FIG. 2 is a procedural flow chart illustrating a manner in which user notifications are generated based on an event and a user's Access Control List (ACL) privileges according to an embodiment of the present invention.

A manner in which ACL module 16 and document policy module 20 (e.g., via a server system 10 and/or client system 14) generate and send document event notifications according to an embodiment of the present invention is illustrated in FIG. 2. Specifically, a document is added to a database or system (e.g., to the ECM system) with the document's ACL defined and retention period set at step 200. The retention period may be set based on organizational policy or regulatory requirements. For example, an organizations' typical document life cycle may be three years while other documents may have variable or indefinite retention periods (e.g., ongoing contracts or stock transactions that do not expire with regard to shareholders).

Once the document is added to the ECM system, the document is used according to organizational guidelines at step 210. For example, work on the document occurs during the normal course of business. In one example, a user electronically performs a document checkout that operates in the same manner as if one were checking a book out of a library. The document checkout indicates that at least one individual is working on the document. When the user is finished working on the document, a document check-in is performed. In some document management systems, multiple users may work on the document simultaneously. As various users check-in their versions of a document, a document merge may be performed to reconcile the changes made to the document by multiple users.

At some point, a policy sweep is performed or conducted at step 220. The policy sweep checks each document or a set of documents in the ECM system in order to determine if an action should be taken with respect to the document. In one example, the policy sweep may check a document to determine if the document's retention period has expired, and if so the document may be marked for deletion at some future point in time (e.g., one week, one month, etc.). The policy sweep may be performed periodically or on demand. In some ECM systems, the policy sweep is performed by a Content Engine (CE) that monitors content for the ECM. Whether or not a policy event for a given document has been triggered is detected at step 230. If a policy event is not detected at step 230, the process waits for the next policy sweep at 220.

If a policy event has been triggered for a given document, the document's ACL is retrieved, and a distribution list is generated from the ACL at step 240. The ACL may be filtered using rules that are appropriate for the type of policy event. For example, when an upcoming document delete event occurs, the ACL may be filtered to dynamically generate a distribution list for the document's owners. The distribution list may include a series of user names, user identifiers (IDs) or other IDs that may be referred to herein as "members" of the distribution list. In this regard, the distribution list may include non-user/human based IDs for software applications or another entity that has access to the document (e.g., a workflow application). The contact information (e.g., email addresses) for those users (e.g., stakeholders) in the distribution list are obtained from a directory (e.g., using the Lightweight Directory Access Protocol (LDAP)) at step 240. The email addresses may be stored and retrieved from an LDAP server. The LDAP server may be included in one of server systems 10 or client systems 14, or be remote from server systems 10 and client systems 14. As the email addresses are obtained, the document stakeholders are emailed with a notice indicating the occurrence of the policy event (e.g., a document change, expiry of a document retention period, etc.) at step 250.

The email message may be a "canned" message or dynamically generated with event specific information pertinent to the recipient. It should be understood that the event notification need not be limited to email, but may include text messages, faxes, canned voice messages, and the like, using the appropriate contact information (e.g., phone numbers or other forms of addresses). Optionally, at step 260, an action may be taken with respect to the document based on the policy event. For example, actions may include rejecting a document change, extending a document retention period, allowing the extension period to lapse, or the document may deleted or archived, among other available document processing options.

Accordingly, instead of manually creating distribution lists, or predefined users or groups of users for event subscriptions or workflows, the Content Engine (CE) can leverage the existing information in the ACL of the document to automatically create distribution lists. The CE may read the ACL of the document and resolve the users and user groups. For each user or group, the CE resolves the email addresses with the LDAP server and builds the distribution list. The distribution list may contain all the users and user groups, or subsets thereof depending on the user rights, privileges or configuration.

For example, a document is added to the ECMCE object store with an ACL containing a set of users and groups. The document may be used and updated by various users on a regular basis. At the end of the document's defined retention period (e.g., based on organizational policies), some predefined users and groups are notified. However, absent the techniques described herein, if the document is deleted without the owner or privileged users being notified, those users are unable to continue with their work, as they are no longer able to locate the document. If the document owners or privileged users received a notification of the pending document deletion, action could have been taken to save and/or retain the document for further work.

Figure 3:
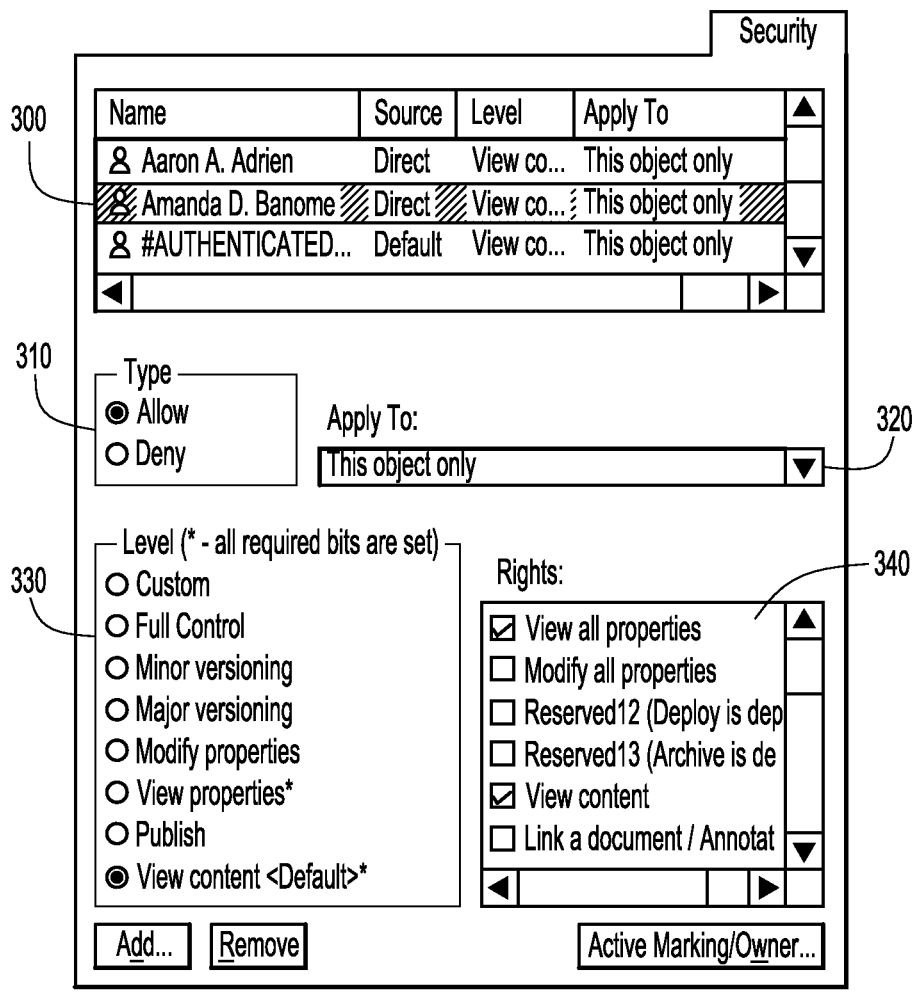
FIG. 3 is a graphical illustration of an example graphical user interface (GUI) screen depicting ACL privileges associated with a group of users for a given document according to an embodiment of the present invention.

By way of a specific example, a document (e.g., "XYZ") was added to an ECM object store and an ACL was assigned to the document. The ACL consisted of the owner, several privileged users that have write access, and a group that has read access to the document. An example graphical user interface (GUI) screen depicting AU, privileges associated with a group of users for a given document is depicted in FIG. 3.

In this example, a single user is highlighted as indicated at reference numeral 300, for example, user object "Amanda D. Banome." As indicated at reference numeral 320, any conferred privileges are applied to "This object only" thereby indicating that the privileges are applied to user object 300 (e.g., "Amanda D. Banome," as opposed to other users or objects). As indicated at reference numeral 310, the privileges further defined are to be allowed. At reference numeral 330, a level of control is conferred. In this example, object "Amanda D. Banome" is granted a "<default>" privilege of "View content" that allows the user the view the document XYZ. The <default> rights indicated at reference numeral 340 convey the rights to "View content" and to "View all properties" for the given document.

In this example, the document may be designated with a storage policy that assigned a retention period of three years. During the three years, the document goes through the normal ECM usage procedures (e.g., checkout, check-in, update, etc.) for 3 years. Toward the end of the three-year period, a Content Engine (CE) conducts a policy sweep to check documents for their current disposition. The policy sweep finds that document XYZ is to be disposed of (e.g., deleted) in one week based on the retention period, thereby triggering a policy event.

At this point, the Content Engine may read the existing ACL for the document, analyze the ACL (e.g., by filtering the ACL) and resolve any security IDs (SIDs) using a security descriptor table lookup (e.g., a SID database). The SID may be a numeric or alphanumeric alias for the user that can be used anonymously within the enterprise. For example, the SID may be common to both the ECM and a personnel directory. The Content Engine resolves email addresses with the LDAP server using the SIDs and builds a distribution list that includes the owner and the privileged users with respect the document that is to be disposed of (e.g., deleted) within the one week period. To simplify ECM operation the ACL may contain an individual's SID and a list of their access attributes (e.g., read-write privileges, group leader for user group "A," etc.).

In one example for resolving the SID or user ID with an email address, an example GUI screen is shown in FIG. 4 that depicts email address resolution for the user highlighted in FIG. 3 (e.g., "Amanda. D. Banome") in order to provide notifications to the user regarding the given document. This user is highlighted as indicated at reference numeral 400. As indicated by the "Principal Name" field, the email address for Amanda D. Banome is "abanome@hgpsidcdom.com." Using the SID to email address resolution mechanism email notifications may be sent to: 1) the document owner and 2) those users identified or filtered as privileged users that the document will be disposed of in one week. Since, in this example the document is still active within its life cycle, the owner or the appropriate user can the necessary action to prevent the document from being disposed.

In another example, stakeholders may be notified when there is a change made to the ACL that affects or changes the stakeholders' level of access. For example, a user may be notified when they are assigned "write" permission for a document.

It will be appreciated that the embodiments described above and illustrated in the drawings represent only a few of the many ways of implementing document event notifications based on document access control lists.

The environment of the present invention embodiments may include any number of computer or other processing systems (e.g., client or end-user systems, servers, etc.) and databases or other repositories arranged in any desired fashion, where the present invention embodiments may be applied to any desired type of computing environment (e.g., cloud computing, client-server, network computing, mainframe, stand-alone systems, etc.) for which the search engine will operate or execute (e.g., the native or target computing environment). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, ACL module, document policy module, etc.). These systems may include any types of monitors and input devices (e.g., keyboard, mouse, voice recognition, etc.) to enter and/or view information.

It is to be understood that the software (e.g., ACL module, document policy module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client, client systems, and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g.,) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., ACLs, documents, filter criteria, etc.). The database system may be implemented by any number of any conventional or other databases, data stores or storage structures (e.g., files, databases, data structures or tables, data or other repositories, etc.) to store information (e.g., ACLs, documents, filter criteria, etc.). The database system may be included within or coupled to the server and/or client systems. The database systems and/or storage structures may be remote from or local to the computer or other processing systems, and may store any desired data (e.g., ACLs, documents, filter criteria, etc.). Further, the various tables (e.g., ACLs, filter criteria, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized for any number or quantity of document life cycle event notifications to any number of users or groups of users. The users to be notified based of ACL may be filtered by any number or type filters. For example, those users with a given manager or security clearance may be given an event notification, while all others are excluded.

The document policies may be developed in any manner (e.g., manually developed, based on a template, rule based, etc.) and contain any type of rules (names, groups, workflows, etc.). Any number of policies may be used for document event notifications.

The present invention embodiments may employ any number of any type of user interface (e.g., Graphical User Interface (GUI), command-line, prompt, etc.) for obtaining or providing information (e.g., ACLs, documents, filter criteria, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report or notifications (e.g., emails, text messages, etc.) may include any information arranged in any fashion, and may be configurable based on rules or other criteria to provide desired information to a user (e.g., a document change, a change in access privileges, a retention policy based document deletion, etc.).

The present invention embodiments are not limited to the specific tasks or algorithms described above, but may be utilized for generating document event notifications associated with any type of document, user or user group.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Small-talk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for managing documents comprising:
   a computer system including at least one hardware processor configured to:
   conduct a policy sweep in accordance with a content management system policy for managing a plurality of documents to identify life cycle events associated with the plurality of documents, wherein the life cycle events comprise events related to a workflow assignment;
   generate distribution lists from access privileges of users for the plurality of documents and store the distribution lists in a data storage in response to occurrence of the life cycle events associated with the plurality of documents, wherein generating the distribution lists comprises:
   filtering the access privileges for an access privilege specified by predefined policy rules for a type of the life cycle events associated with the plurality of documents to selectively identify users with the specified access privilege for the distribution lists and increase an efficiency of the at least one hardware processor for generating the distribution lists; and
   notify members of the distribution lists.

2. The system of claim 1, wherein the access privileges are included in access control lists for the plurality of documents.

3. The system of claim 2, wherein the notifying the members of the distribution lists includes:
   resolving email addresses of the members of the distribution lists.

4. The system of claim 1, wherein the at least one processor is further configured to:
   receive a message from one of the members of the distribution lists for an action to be performed by a content management system.

5. A computer program product for managing documents in a content management system comprising:
   a computer readable storage medium having computer readable program code embodied therewith, the computer readable program code executable by at least one hardware processor to cause the at least one hardware processor to:
   conduct a policy sweep in accordance with a content management system policy for managing a plurality of documents to identify life cycle events associated with the plurality of documents, wherein the life cycle events comprise events related to a workflow assignment;
   generate distribution lists from access privileges of users for the plurality of documents and store the distribution lists in a data storage in response to occurrence of the life cycle events associated with the plurality of documents, wherein generating the distribution lists comprises:
   filtering the access privileges for an access privilege specified by predefined policy rules for a type of the life cycle events associated with the plurality of documents to selectively identify users with the specified access privilege for the distribution lists and increase an efficiency of the at least one hardware processor for generating the distribution lists; and
   notify members of the distribution lists.

6. The computer program product of claim 5, wherein the access privileges are included in access control lists for the plurality of documents.

7. The computer program product of claim 5, wherein the notifying the members of the distribution lists includes:
   resolving contact information of the members of the distribution lists.

8. The computer program product of claim 7, wherein the contact information includes email addresses of the members of the distribution lists obtained using a directory access protocol.

9. The computer program product of claim 5, wherein the computer readable program code further causes the at least one hardware processor to:
   receive a message from one of the members of the distribution lists for an action to be performed.

* * * * *